US008521188B2

(12) United States Patent
Halivaara et al.

(10) Patent No.: US 8,521,188 B2
(45) Date of Patent: Aug. 27, 2013

(54) AREA EVENT SUPPORT INDICATION

(75) Inventors: Ismo Halivaara, Tampere (FI); Martta Seppala, San Jose, CA (US)

(73) Assignee: Nokia Corporation, Espoo (FI)

( * ) Notice: Subject to any disclaimer, the term of this patent is extended or adjusted under 35 U.S.C. 154(b) by 35 days.

(21) Appl. No.: 12/988,511

(22) PCT Filed: Mar. 25, 2009

(86) PCT No.: PCT/FI2009/050222
§ 371 (c)(1),
(2), (4) Date: Dec. 17, 2010

(87) PCT Pub. No.: WO2009/127776
PCT Pub. Date: Oct. 22, 2009

(65) Prior Publication Data
US 2011/0171969 A1    Jul. 14, 2011

Related U.S. Application Data
(60) Provisional application No. 61/045,531, filed on Apr. 16, 2008.

(51) Int. Cl.
*H04W 24/00*   (2009.01)
*H04M 11/04*   (2006.01)
(52) U.S. Cl.
USPC .................. 455/456.3; 455/404.2; 455/456.1
(58) Field of Classification Search
USPC ...................................................... 455/456.1
See application file for complete search history.

(56) References Cited

U.S. PATENT DOCUMENTS
| | | | |
|---|---|---|---|
| 5,950,125 A * | 9/1999 | Buhrmann et al. | 455/432.1 |
| 7,317,927 B2 * | 1/2008 | Staton et al. | 455/456.4 |
| 2003/0100334 A1 | 5/2003 | Mazzara, Jr. | |
| 2006/0099969 A1 | 5/2006 | Staton et al. | |
| 2006/0135174 A1 * | 6/2006 | Kraufvelin et al. | 455/456.1 |
| 2006/0168185 A1 | 7/2006 | McCall et al. | |
| 2007/0054634 A1 | 3/2007 | Seppala | |

FOREIGN PATENT DOCUMENTS
| | | |
|---|---|---|
| CN | 1689370 | 10/2005 |
| CN | 1703927 | 11/2005 |
| JP | 2003-281694 A | 10/2003 |
| JP | 2004-533034 A | 10/2004 |

(Continued)

OTHER PUBLICATIONS
International Search Report and Written Opinion of the International Searching Authority for corresponding Patent Cooperation Treaty Application No. PCT/FI2009/050222 dated Jun. 24, 2009, 14 pages.

(Continued)

*Primary Examiner* — Huy C Ho
(74) *Attorney, Agent, or Firm* — Alston & Bird LLP

(57) ABSTRACT

Systems and methods are provided enabling a terminal to send an area shape capability indication to a location server. Depending on the use case scenario, the location server can perform at least one of the following operations, before sending the area event request to the terminal. The location server can select a shape that is both allowed by the requesting entity and supported by the terminal. Alternatively, the location server can convert the requested shape into a supported one by some approximation function if the requested shape(s) is/are not supported by the terminal. Furthermore, the location server can choose to terminate the session if the terminal does not support any of the requested (allowed) shapes. It should be noted that different priorities can be assigned to or associated with various area shapes as well.

23 Claims, 5 Drawing Sheets

(56) References Cited

FOREIGN PATENT DOCUMENTS

| | | |
|---|---|---|
| JP | 2006-502681 A | 1/2006 |
| JP | 2008-524670 A | 7/2008 |
| WO | 02065736 A2 | 8/2002 |
| WO | 2004028170 A2 | 4/2004 |
| WO | 2004034721 A1 | 4/2004 |
| WO | WO 2006/052400 A1 | 5/2006 |

OTHER PUBLICATIONS

Open Mobile Alliance, "User Plane Location Protocol", Draft Version 2.0—Mar. 28, 2008, OMA-TS-ULP-V2_0-20080328-D.

3GPP TS 24.030V3.2.0 (Jun. 2001); 3rd Generation Partnership Project Technical Specification Group Core Network; Location Services,(LCS); Supplementary Service Operations—Stage 3 (Release 1999), Chapter 5.1, Figure 5.1.

Open Mobile Alliance, OMA-TS-ULP-V1_0-20070615-A "User Plane Location Protocol", Approved Version 1.0-Jun. 15, 2007, pp. 1-52.

Office Action for Japanese Application No. 2011-504490 dated Aug. 9, 2012.

Office Action from Korean Patent Application No. 10-2010-7025482, dated Apr. 27, 2012.

3GPP TS 24.030 v4.1.0 (Jun. 2001); $3^{rd}$ Generation Partnership Project; Technical Specification Group Core Network; Location Services (LCS); Supplementary Service Operations—Stage 3 (Release 4).

Office Action for Korean Application No. 2010-7025482; dated Feb. 12, 2013.

Office Action for Chinese Application No. 200980113189.2; dated Feb. 5, 2013.

\* cited by examiner

AREA EVENT SUPPORT INDICATION

RELATED APPLICATION

This application was originally filed as PCT Application No. PCT/FI2009/050222 filed Mar. 25, 2009, which claims priority benefit from U.S. Provisional Application No. 61/045,531, filed Apr. 16, 2008.

FIELD OF THE INVENTION

The present invention relates generally to the field of mobile device location services. More particularly, the present invention relates to indicating types of area shapes that a terminal supports for triggering area events with regard to location protocols.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various location protocols have been defined to locate, e.g., mobile phones or other cellular terminals. Each cellular system/mobile network-type generally utilizes its own location protocol. For example, a Global System for Mobile Communications (GSM) system can utilize a protocol referred to as Radio Resource Location Services Protocol (RRLP). Wideband Code Division Multiple Access (WCDMA) networks may use a protocol referred to as Radio Resource Control (RRC). CDMA networks may utilize a protocol referred to as Telecommunications Industry Association-801 (TIA-801).

In addition to these control plane protocols, the Open Mobile Alliance (OMA) standardization organization has introduced a scheme which can be referred to as Secure User Plane Location (SUPL). SUPL can utilize user plane data bearers to provide for the transferring of location information. In addition, SUPL can utilize user plane data bearers to carry positioning technology-related protocols between an SUPL enabled terminal (SET) and a network in which the SET is operational. The location information can be utilized to compute the location of a SET.

Many of these protocols support what is commonly referred to as "triggered positioning" where, e.g., a location report is triggered based on some event. These events can be based on, e.g., timers, radio measurements, and/or user location. User location events generally fall into two categories. A first location event type includes scenarios when the location of a terminal has changed more than some predefined limit. Another type of location event can be associated with/related to some geographical area. These user location events are generally triggered when certain criteria related to an area event trigger is met, and various types of areas upon which an area event trigger is based can be defined. For example, user location events can be triggered, e.g., when a user moves in or out of some area, where areas can be represented by different shapes. The shapes conventionally utilized in various standards/protocols include, e.g., a circle (defined by a center point, coordinates, and radius), an ellipse (defined by a center, a semi-major axis, a semi-minor axis, and orientation), and a polygon (defined by coordinates of corner points of the polygon).

An area can also be defined by a group of predetermined portions of a larger geographical area, such as a certain number of blocks within a particular city. In addition, a trigger can be set to activate for a user either upon entering a particular area or upon leaving the particular area. Activation of a trigger, as discussed above, occurs when certain trigger-related criteria is fulfilled. Upon activation of the trigger, some other action or event is triggered. For example, triggered positioning can be used for launching a reminder to a user, e.g., upon entering department store, a notification reminding a user to buy a new umbrella is sent or shown to the user.

As described above, standards such as OMA SUPL enable a location server to define several types of area shapes (e.g., circles, ellipses, polygons) for a terminal to trigger area events. However, in conventional standards/protocols, there is no system or method that allows terminals to indicate what shapes it supports or what shapes would be preferred by the location server or the terminal. Moreover, the above standards/protocols do not address situations involving unspecified preferences. Furthermore, although the standards/protocols define certain area event parameters, the proper use of these area event parameters are not well defined.

SUMMARY OF THE INVENTION

Various embodiments are described allowing a terminal to send an area shape capability indication to a location server. Depending on the use case scenario, the location server can perform at least one of the following operations, before sending the area event request to the terminal. The location server can select a shape that is both allowed by the requesting entity and supported by the terminal. Alternatively, the location server can convert the requested shape into a supported one by some approximation function if the requested shape(s) is/are not supported by the terminal. Furthermore, the location server can choose to terminate the session if the terminal does not support any of the requested (allowed) shapes. It should be noted that different priorities can be assigned to or associated with various area shapes as well.

In accordance with various embodiments, a location server can determine which area shapes are supported by a terminal and can choose the best "fit" for each use case scenario. Additionally, due to the area event feature described above, the location server can be sure that the area events are triggered correctly. Furthermore, terminals in different segments can support different types of area shapes. For example, low category and/or low power consumption-oriented terminals can support computationally less demanding shapes, while more feature-rich terminals can support more complex shapes.

These and other advantages and features of various embodiments of the present invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Embodiments of the invention are described by referring to the attached drawings, in which.

DETAILED DESCRIPTION OF THE PREFERRED EMBODIMENTS

Various embodiments described herein provide systems and methods of indicating an area shape capability to a location server. It should be noted that although various embodiments are described below in reference to the OMA SUPL protocol, various embodiments can be implemented in other systems/networks that utilize different location standards/protocols, e.g., the OMA Motion Location Protocol (MLP).

In accordance with various embodiments, a terminal sends an area shape capability indication to a location server. Depending on the use case scenario, the location server can perform at least one of the following operations, before sending the area event request to the terminal. The location server can select a shape that is both allowed by the requesting entity and supported by the terminal. Alternatively, the location server can convert the requested shape into a supported one by some approximation function if the requested shape(s) is/are not supported by the terminal. Furthermore, the location server can choose to terminate the session if the terminal does not support any of the requested (allowed) shapes. It should be noted that different priorities can be assigned to or associated with various area shapes either before a terminal sends the area shape capability indication or defined statically in the specification. For example, one of the shapes (e.g., circle, ellipse, polygon) may be defined to be a preferred shape, or a default shape that at least needs to be supported, upon which a location-based trigger can be defined.

Figure 1:
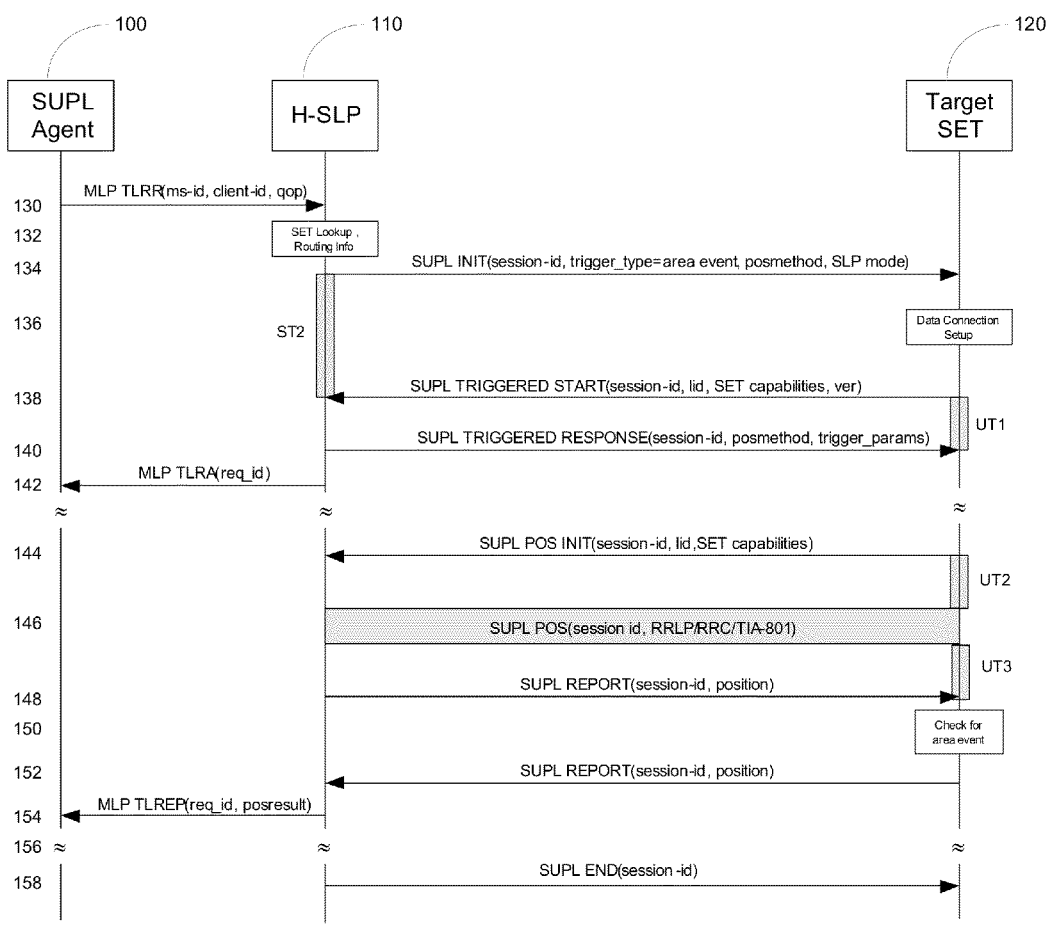
FIG. 1 is a graphical representation of a signaling sequence in accordance with various embodiments.

A SUPL session can be initiated either by a SET or by the network. In the case of the OMA SUPL protocol context, various embodiments can be implemented as shown in FIG. 1 which is a graphical representation of a signaling sequence of messages between an SUPL agent 100, a Home SUPL Location Platform (H-SLP) 110 with which the SUPL agent 100 is associated, and a target SUPL enabled terminal (SET) 120. It should be noted that network initiated services are services which originate from within a SUPL network. It may also be noted that for network initiated services, a SUPL agent 100 resides in the network, where the SUPL agent 100 can refer to one or more service access points which access network resources to obtain location information.

In addition, for network initiated services, a SUPL location platform (SLP) and the SET can support various functions and/or messaging including, for example: SUPL INIT, i.e., a message used by the SLP to initiate a SUPL session with the SET, which can include session-id, positioning method, SLP mode information, and a trigger type (associated with, e.g., a particular area event); and SUPL POS INIT, i.e., a message which can be used by the SET in initiating a positioning protocol session with the SLP that can include session-id, location identifier (lid), and SET capabilities information (indicative of, e.g., supported area shapes). Additional functionality and messaging can include, e.g.: SUPL POS, i.e., a message which can be used between the SLP and the SET to exchange a positioning procedure that can include session-id information and positioning process messages, e.g., RRLP/RRC/TIA-801 messages; SUPL REPORT message, i.e., a message that can send a position result/report that includes session-id and position information; and SUPL END, i.e., a message for ending an existing SUPL session which can include session-id information are also supported. Moreover, functions and/or methods can also include, e.g.: SUPL TRIGGERED START, i.e., a message that is sent with SET Capabilities information element (IE) and can include session-id, lid, and version information; SUPL TRIGGERED RESPONSE, i.e., a message for responding with trigger parameters included in Area event parameters IE, which contains geographic target information (described in greater detail below). It should be noted that the SLP is a network entity that can be responsible for SUPL service management and position determination.

As shown in FIG. 1, at 135, a Mobile Location Platform-Trigger Location Reporting Request (MLP TLRR) message is sent from the SUPL agent 100 to the H-SLP 110 that includes, e.g., ms-id (indicative of the positioning of Target SET 120), client-id (indicative of a requesting client), and qop (indicative of, e.g., a quality/accuracy of the positioning requested by the client). At 132, the H-SLP 110 performs SET lookup and routing information processes. At 134, a SUPL INIT message is sent to the Target SET 120. At 136, the Target SET 120 performs a data connection setup. At 138, a SUPL TRIGGERED START message is sent. As described above the SUPL TRIGGERED START message is sent with SET Capabilities IE. In accordance with various embodiments, a parameter, which can be referred to as "geographic target area shape" is added to the area event capabilities information of the SET Capabilities IE. This parameter defines the geographic target area shapes supported by the SET, e.g., Target SET 120, as follows:

```
New parameter defined in ASN.1:
GeoAreaShapesSupported ::= SEQUENCE {
    circularArea    BOOLEAN,
    ellipticalArea  BOOLEAN,
    polygonArea     BOOLEAN,
    ...}
```

Alternatively, if, for example, a circular shape is defined as mandatorily supported in the standard, the parameter would be as follows:

```
GeoAreaShapesSupported ::= SEQUENCE {
    ellipticalArea  BOOLEAN,
    polygonArea     BOOLEAN,
    ...}
```

At 140, a SUPL TRIGGERED RESPONSE message is sent with trigger parameters included in area event parameters IE, which contain the geographic target area definition. For example, a circular area may be defined as being a mandatory shape. Because of the low computational load associated with circular areas, it is a "natural" choice as a primary shape to be supported. It should be noted again however, that various embodiments are not limited to utilizing circular shapes, but can be implemented for use with, e.g., elliptical shapes, polygonal shapes, etc. At 142 a MLP Triggered Location Reporting Answer (TLRA) including a requested id parameter is sent from the H-SLP 110 to the SUPL Agent 100. At 144, a SUPL POS INIT message is sent from the H-SLP 110 and at 146, SUPL POS messaging occurs between the H-SLP 110 and the Target SET 120. At 148, a SUPL REPORT is sent from the H-SLP 110, and at 150 the Target SET 120 checks for any area event(s). At 152, the Target SET 120 returns a SUPL REPORT back to the H-SLP 110 and at 154, the H-SLP 110 sends a MLP Triggered Location Report (TL-REP) message including the calculated req_id and posresult information to the SUPL Agent 110. At 156, additional messaging may occur/be repeated, and at 158, a SUPL END message is sent from the H-SLP 110 to the Target SET 120.

Tables 2 and 3 show the above-described modifications to the OMA SUPL signaling. For example, Table 2 shows the inclusion of a geographic target area shape information into the SET capabilities parameter. Table 3 describes the construction of area event trigger parameters, which may be required is the trigger type parameter is set to an area event. For example, Table 3 shows, e.g., that a circular shape takes preference over elliptical and polygonal area shapes.

TABLE 1

| Parameter | Presence | Value/Description |
|---|---|---|
| SET capabilities | — | SET capabilities (not mutually exclusive) in terms of supported positioning technologies and positioning protocols. During a particular SUPL session, a SET may send its capabilities more than once - specifically, in SET initiated cases, the SET capabilities are sent in SUPL START, SUPL TRIGGERED START and in SUPL POS INIT. For immediate requests, the SET capabilities MUST NOT change during this particular session. For triggered requests, the SET capabilities MAY change during a session. The SET Capabilities parameter MAY also be used by the SET to inform the H-SLP about its service capabilities. |
| >Pos Technology | M | Defines the positioning technology. Zero or more of the following positioning technologies (including those listed in the optional GANSS Position Methods structure): SET-assisted A-GPS SET-based A-GPS Autonomous GPS AFLT E-CID E-OTD OTDOA Note. The E-CID bit SHALL be set only when TA and/or NMR information or Pathloss information is provided within the Location ID IE. |
| >>GANSS Position Methods | O | Defines the supported GANSS (i.e. other than A-GPS). If included, this parameter is repeated for each supported GANSS |
| >>>GANSS ID | M | Defines the GANSS. Integer (0 . . . 15) 0: Galileo 1-15: Reserved for future use |
| >>>GANSS Positioning Modes | M | Bitmap defining the supported modes for GNSS indicated by GANSS ID. Bit 0: SET Assisted Bit 1: SET Based Bit 2: Autonomous |
| >>>GANSS Signals | M | Bitmap defining the supported signals for GNSS indicated by GANSS ID. For Galileo, bits are interpreted as: Bit 0: E1 Bit 1: E5a Bit 2: E5b Bit 3: E5a + E5b Bit 4: E6 Bits 5-7: Spare |
| >Pref Method | M | One of the following preferred modes: A-GPS SET-assisted preferred A-GPS SET-based preferred No preferred mode A-GNSS SET-assisted preferred A-GNSS SET-based preferred Note: A-GPS is used if GPS only is preferred. A-GNSS covers other GNSS and hybrid usage of several GNSS, e.g. GPS and Galileo. If A-GNSS SET-based or SET-assisted is preferred and Extended Position Method IE is not included, then any of the supported GNSSs is preferred. |
| >Pos Protocol | M | Zero or more of the following positioning protocols (bitmap): RRLP RRC TIA-801 |
| >Pos Protocol Version RRLP | CV | Describes the protocol version of RRLP Positioning Protocol. It is required if RRLP is identified in the Pos Protocol parameter. |
| >>Major Version Field | M | First (most significant) element of the version number for RRLP, range: (0 . . . 255) |
| >>Technical Version Field | M | Second element of the version number for RRLP, range: (0 . . . 255) |
| >>Editorial Version Field | M | Third (least significant) element of the version number for RRLP, range: (0 . . . 255) |
| >Pos Protocol Version RRC | CV | Describes the protocol version of RRC Positioning Protocol. It is required if RRC is identified in the Pos Protocol parameter. |
| >>Major Version Field | M | First (most significant) element of the version number for RRC, range: (0 . . . 255). |
| >>Technical Version Field | M | Second element of the version number, range: (0 . . . 255) |
| >>Editorial Version Field | M | Third (least significant) element of the version number for RRC, range: (0 . . . 255) |

TABLE 1-continued

| Parameter | Presence | Value/Description |
|---|---|---|
| >Pos Protocol Version TIA-801 | CV | Describes the protocol version of 3 GPP2 C.S0022 (TIA-801) Positioning Protocol. It is required if TIA-801 is identified in the Pos Protocol parameter. |
| >>Supported Pos Protocol Version TIA-801 | M | Specifies a list of up to 8 different supported 3GPP2 C.S0022 versions. This parameter is required (with at least one entry in the list) if TIA-801 is identified in the Pos Protocol parameter. |
| >>>Revision Number | M | Revision part of document number for the specifications of C.S0022 Positioning Protocol. Value: [0, A-Z] |
| >>>Point Release Number | M | Point Release number for C.S0022, range: (0 . . . 255). |
| >>>Internal Edit Level | M | Internal Edit Level for C.S0022, range: (0 . . . 255). |
| >Service Capabilites | O | The service capabilities of the SET are described in this parameter. The SET MAY send this parameter in SUPL START, SUPL POS INIT, SUPL TRIGGERED START, SUPL AUTH REQ and SUPL END. The purpose of this parameter is to inform the H-SLP about the service capabilities of the SET |
| >>services supported | M | Defines the supported services by the SET. Only Network Initiated services are relevant in this context. Zero or more of the following services are supported: Periodic Trigger Area Event Trigger |
| >>reporting capabilities | CV | Defines the reporting capabilities of the SET. This parameter is only required if periodic triggers are supported by the SET in which case the parameter is mandatory. |
| >>>rep mode | M | Supported reporting mode(s): Real time Quasi real time Batch reporting (At least one of the three reporting modes must be supported) |
| >>>batch rep type | M | Defines the type of batch reporting supported by the SET (only applicable to quasi real time and batch reporting): Report position (true if reporting of position is allowed, false otherwise) Report measurements (true if reporting of measurements is supported, false otherwise) Historic measurements (true if reporting of measurements is supported, false otherwise) |
| >>>batch rep params | M | Maximum number of positions/measurements (range: 1 to 2048) Maximum number of historical measurements (range: 1 to 64) |
| >>session capabilities | M | Defines the session capabilities of the SET: Total number of simultaneous sessions. Maximum number of simultaneous periodic triggered sessions (only used for periodic triggers). Maximum number of simultaneous area event triggered sessions (only used for area event triggers). |
| >>area event capabilities | CV | Defines the area event capabilities of the SET. This parameter is only required if area event triggers are supported by the SET in which case the parameter is mandatory. |
| >>>Geographic target area shape | M | This parameter defines the geographic target area shapes supported by the SET in addition to a mandatory circular area |
| >>>max number of geographical target areas | O | This parameter defines the maximum number of geographic target areas the SET supports. (range: 1 to 32) This parameter is optional. If not present, the SET does not support geographical target areas. |
| >>>max number of Area Id Lists | O | This parameter defines the maximum number of Area Id Lists the SET supports. (range: 1 to 32) This parameter is optional. If not present, the SET does not support Area Ids. |
| >>>max number of Area Ids per Area Id List | CV | This parameter defines the maximum number of Area Ids per Area Id List the SET supports. (range: 1 to 256) This parameter is conditional: if max number of Area Id Lists is present, then this parameter MUST be present. Otherwise this parameter MUST NOT be present. |

TABLE 2

| Parameter | Presence | Value/Description |
|---|---|---|
| Area Event Type | M | Describes the area event trigger type. This parameter describes what kind of event should trigger a report. The valid types are: Entering event type Leaving event type Inside event type |

TABLE 2-continued

| Parameter | Presence | Value/Description |
|---|---|---|
| Location estimate | M | Outside event type<br>The value of this parameter is "true" or "false". If true, it indicates the location estimates is required. If false, it indicates the location estimates is not required. |
| Repeated reporting | O | Defines the parameters for repeated reporting. If not present, only one report shall be sent.<br>When repeated reporting is used, the SET and the SLP SHALL maintain the triggered event session until the maximum number of reports has been sent, the stop time (if included) has been reached, or either the SET or the SLP has sent a SUPL TRIGGERED STOP or a SUPL END to end the session. |
| >Minimum Interval Time | M | Defines the minimum time between reports from SET in an Area Event Trigger session. For repeated reporting, an area event trigger cannot be fulfilled unless the minimum time interval has elapsed since the last report.<br>Range: (1 . . . 604800). Units in seconds. |
| >Number of Report | M | Defines the maximum number of reports in an Area Event Trigger session.<br>Range: (1 . . . 1024) |
| Start Time | O | Indicates the start of the period when the trigger condition is able to be fulfilled. Start Time is interpreted relative to the current time i.e. to the time when the message containing the parameter is received by the H-SLP or the SET.<br>Start Time is OPTIONAL. If not present, a Start Time of 0 SHALL be used and the trigger condition is allowed to be fulfilled immediately. Units in seconds (range: 0 to 2678400). |
| Stop Time | O | Stop Time is interpreted relative to the current time i.e. to the time when the message containing the parameter is received by the H-SLP or the SET. It indicates when the SET shall stop the triggered session if it has not already been stopped for other reasons.<br>Stop Time is OPTIONAL. If not present, a Stop Time of 8639999 seconds after the start time SHALL be used. Stop Time SHALL be greater than Start Time (if present). Stop Time - Start Time SHALL NOT be more than 8639999 (100 days in seconds)<br>Units in seconds (range: 0 to 11318399). |
| Geographic Target Area List | O | Defines a list of geographic target areas. This parameter is OPTIONAL.<br>Maximum number of areas are according to element Max Geo Target Area in SET capabilities. |
| >Geographic Target Area | M | Defines a geographic target area in terms of either:<br>CircularArea (preferred)<br>EllipticalArea<br>Polygon |
| Area Id Lists | CV | This parameter contains one or more Area Id lists. This parameter is REQUIRED when the Geographic Target Area List is NOT present and is OPTIONAL when the Geographic Target Areas are present. The maximum number of Area Id lists to be included is determined by the element "Max Area Id List" in SET capabilities. |
| >Area Id list | M | Each Area Id list consists of a set of Areas Ids plus a Geographic Area Mapping List. |
| >>Area Id Set | M | A list of area ids. The area ids listed can be any combination of GSM Area Ids, WCDMA Area Ids, CDMA Area Ids, HRPD-Area Ids, UMB-Area Ids, LTE-Area Ids, WLAN Area Ids or WiMAX Area Ids. Each set can contain from 1 to [MaxAreaId] area ids. |

Figure 2:
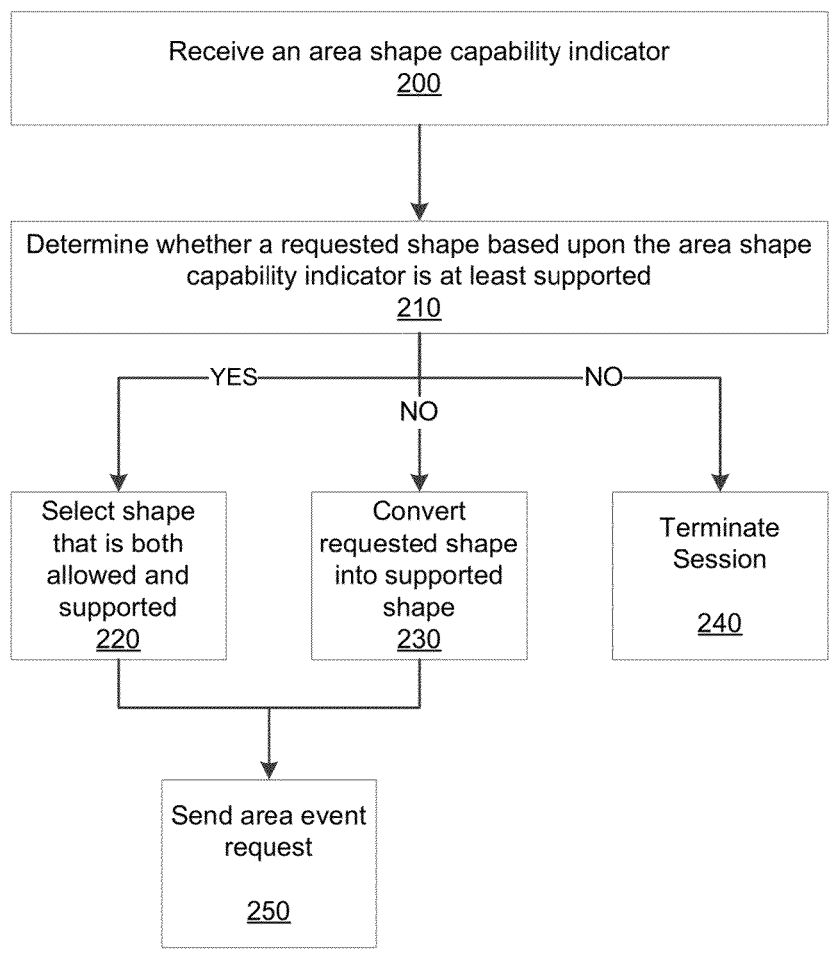
FIG. 2 is a flow chart illustrating operations performed in accordance with various embodiments.

In accordance with various embodiments, FIG. 2 illustrates operations performed to effectuate the use of area shape capability information that can be sent, e.g., from a terminal to a location server. At 200, from the location server perspective, an area shape capability indicator is received from, e.g., a terminal such as a SET. At 210, depending on the use case scenario, the location server can determine whether the requested shape is at least supported by the SET. If the requested shape is both allowed and supported, at 220, that requested shape is selected. If the requested shape is not support by the SET, at 230, the location server can convert the requested shape into a supported one by some approximation function. Furthermore, at 240, the location server can choose to terminate the session if the SET does not support any of the requested (allowed) shapes. At 250, if the requested shape is either selected or converted, an area event request is sent to the SET based on the requested shape that is, again, either selected or converted into a supported shape.

In accordance with various embodiments, a location server can determine which area shapes are supported by a terminal and can choose the best "fit" for each use case scenario. Additionally, due to the area event feature described above, the location server can be sure that the area events are triggered correctly. Furthermore, terminals in different segments can support different types of area shapes. For example, low category and/or low power consumption-oriented terminals can support computationally less demanding shapes, while more feature-rich terminals can support more complex shapes. Further still, because the location server is cognizant of which shapes are supported by a terminal, it may provide a transformation function(s) that converts a requested shape into a supported shape.

Figure 3:
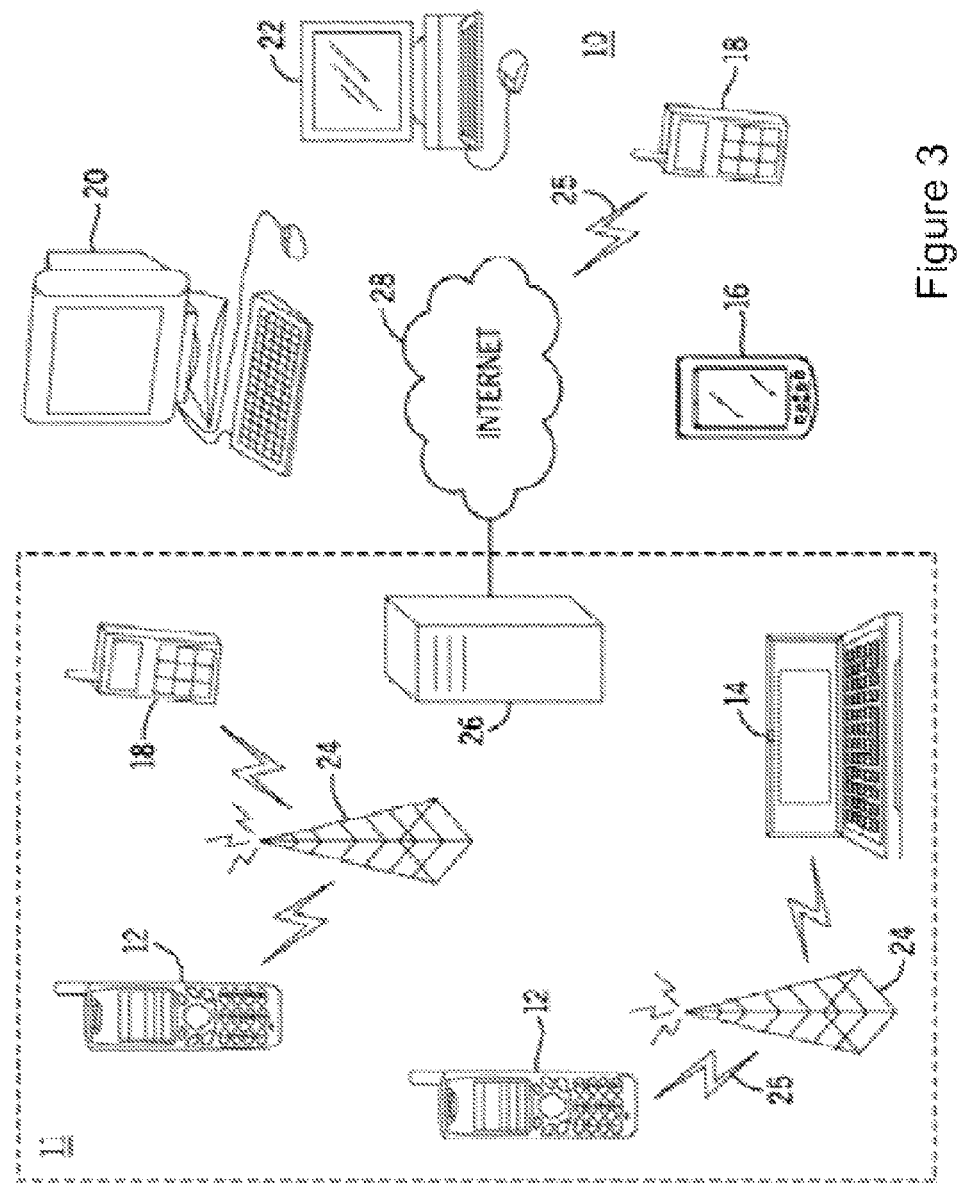
FIG. 3 is an overview diagram of a system within which various embodiments of the present invention may be implemented.

FIG. 3 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 3 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 4:
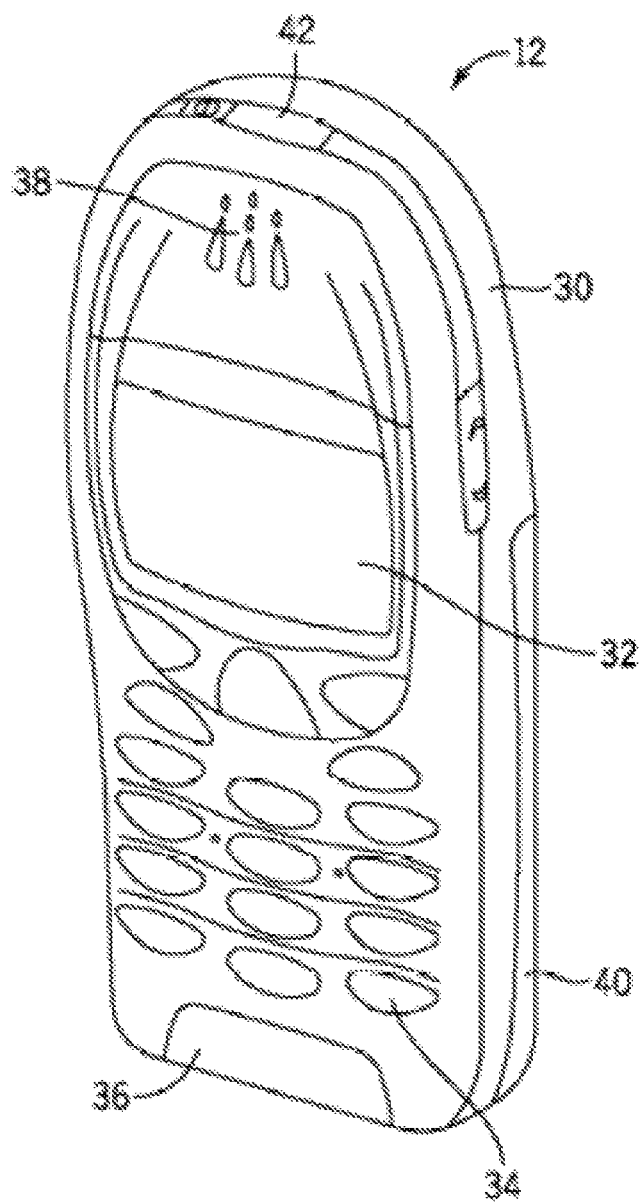
FIG. 4 is a perspective view of an electronic device that can be used in conjunction with the implementation of various embodiments of the present invention.
Figure 5:
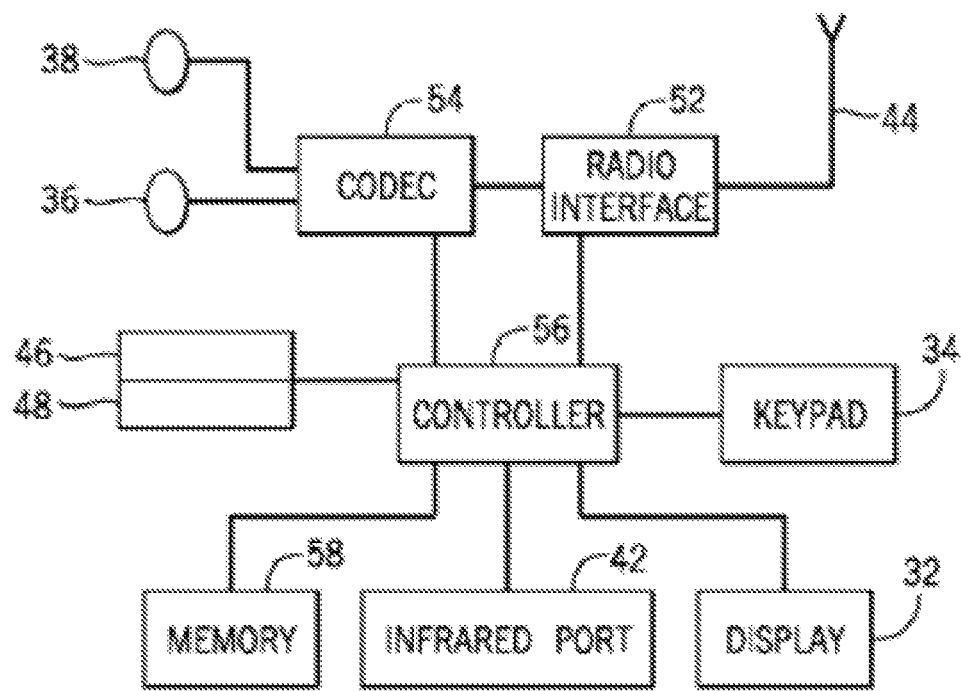
FIG. 5 is a schematic representation of the circuitry which may be included in the electronic device of FIG. 4.

FIGS. 4 and 5 show one representative electronic device 12 within which the present invention may be implemented. It should be understood, however, that the present invention is not intended to be limited to one particular type of device. The electronic device 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   receiving an area shape capability indicator;
   determining, by a processor, whether a requested shape based upon the area shape capability indicator is supported;
   upon a determination that the requested shape is supported, sending an area event request based on the requested shape; and
   upon a determination that the requested shape is not supported, converting the requested shape to a supported shape.

2. The method of claim 1, further comprising selecting the requested shape upon a determination that the requested shape is both allowed and supported.

3. The method of claim 1, where the converting of the requested shape is performed in accordance with an approximation function.

4. The method of claim 1, further comprising terminating a triggering session upon a determination that the requested shape is not supported.

5. The method of claim 1, further comprising assigning a priority to the requested shape prior to the receipt of the area shape capability indicator.

6. The method of claim 1, further comprising statically defining a priority assigned to the requested shape.

7. The method of claim 1, wherein the area shape capability indicator is received from a secure user plane location enabled terminal.

8. The method of claim 1, wherein the area shape capability indicator is received at a location server.

9. The method of claim 1, wherein the area event request is sent to a secure user plane location enabled terminal.

10. The method of claim 1, wherein the area shape capability indicator comprises a geographic target area shape parameter.

11. A computer program product, embodied in a non-transitory computer-readable medium, comprising computer code for performing the processes of
receiving an area shape capability indicator;
determining whether a requested shape based upon the area shape capability indicator is supported;
upon a determination that the requested shape is supported, sending an area event request based on the requested shape; and
upon a determination that the requested shape is not supported, converting the requested shape to a supported shape.

12. An apparatus, comprising:
a processor; and
a memory unit communicatively connected to the processor and comprising:
computer code for receiving an area shape capability indicator;
computer code for determining whether a requested shape based upon the area shape capability indicator is supported;
computer code for sending an area event request based on the requested shape upon a determination that the requested shape is supported; and
computer code for converting the requested shape to a supported shape upon a determination that the requested shape is not supported.

13. The apparatus of claim 12, wherein the memory unit further comprises computer code for selecting the requested shape upon a determination that the requested shape is both allowed and supported.

14. The apparatus of claim 12, wherein the memory unit further comprises computer code for performing the converting of the requested shape in accordance with an approximation function.

15. The apparatus of claim 12, wherein the memory unit further comprises computer code for terminating a triggering session upon a determination that the requested shape is not supported.

16. The apparatus of claim 12, wherein the memory unit further comprises computer code for assigning a priority to the requested shape prior to the receipt of the area shape capability indicator.

17. The apparatus of claim 12, wherein the memory unit further comprises computer code configured to statically define a priority assigned to the requested shape.

18. The apparatus of claim 12, wherein the area shape capability indicator is received from a secure user plane location enabled terminal.

19. The apparatus of claim 12, wherein the area event request is sent to a secure user plane location enabled terminal.

20. The apparatus of claim 12, wherein the area shape capability indicator comprises a geographic target area shape parameter.

21. The apparatus of claim 12, wherein the apparatus is part of a location server.

22. A system, comprising:
a secure user plane location enabled terminal for transmitting an area shape capability indicator;
a location server comprising a receiver for receiving the area shape capability indicator;
the location server further comprising computer code for
determining whether a requested shape based upon the area shape capability indicator is supported;
upon a determination that the requested shape is supported, computer code for sending an area event request based on the requested shape; and
upon a determination that the requested shape is not supported, computer code for converting the requested shape to a supported shape.

23. The system of claim 22, wherein the computer code for sending the area event request is configured to cause the location server to send the area event request to the secure user plane location enabled terminal.

* * * * *

UNITED STATES PATENT AND TRADEMARK OFFICE
CERTIFICATE OF CORRECTION

PATENT NO.         : 8,521,188 B2                                        Page 1 of 1
APPLICATION NO.    : 12/988511
DATED              : August 27, 2013
INVENTOR(S)        : Halivaara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 96 days.

Signed and Sealed this

Fifteenth Day of September, 2015

Michelle K. Lee
*Director of the United States Patent and Trademark Office*